Figure 1:
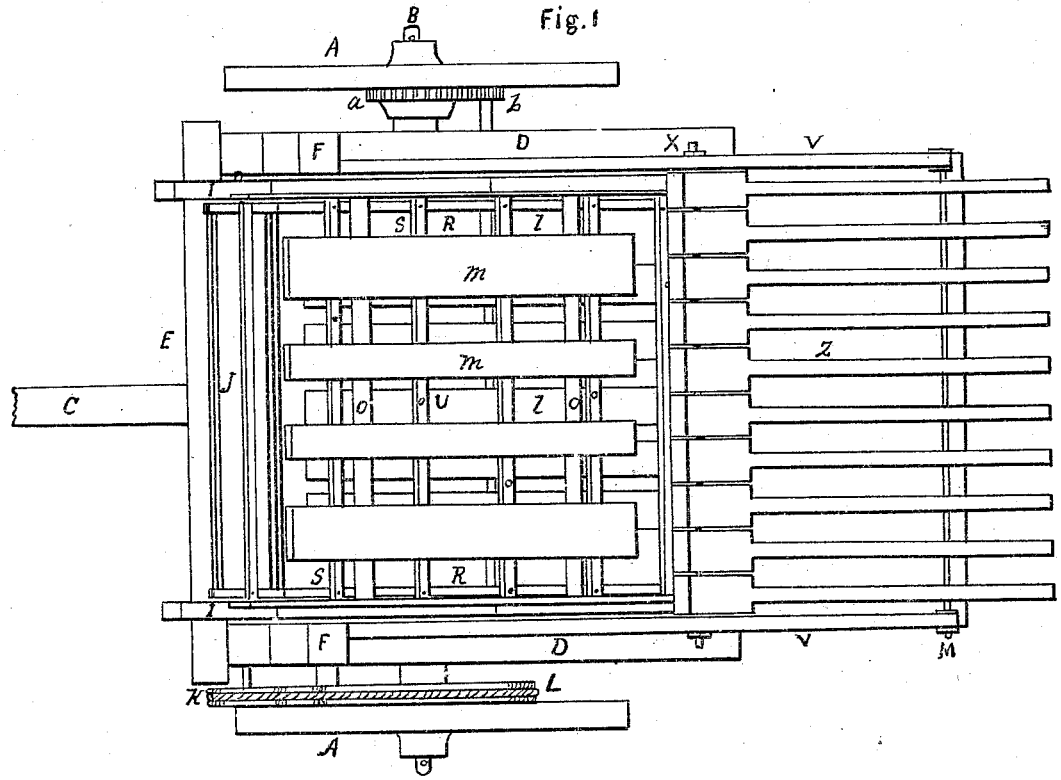

Sheet 1 - 3 Sheets.

Lewis & Durbin.
Hay Loader
N° 45726.  Patented Jan. 3, 1865.

Witnesses.
Chas. Hadaway
E. N. Callan

Inventors.
Miles H. Lewis
& John C. Durbin
By their Attorney
J. Dennis Jr.

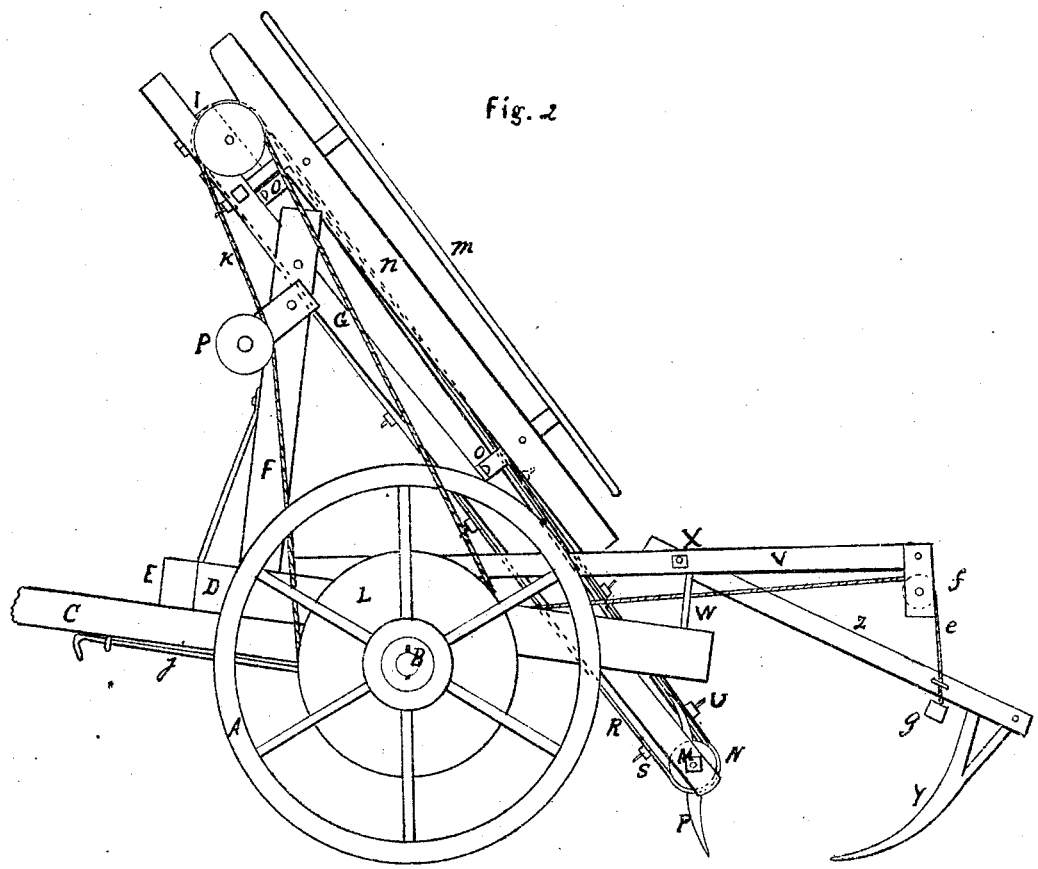

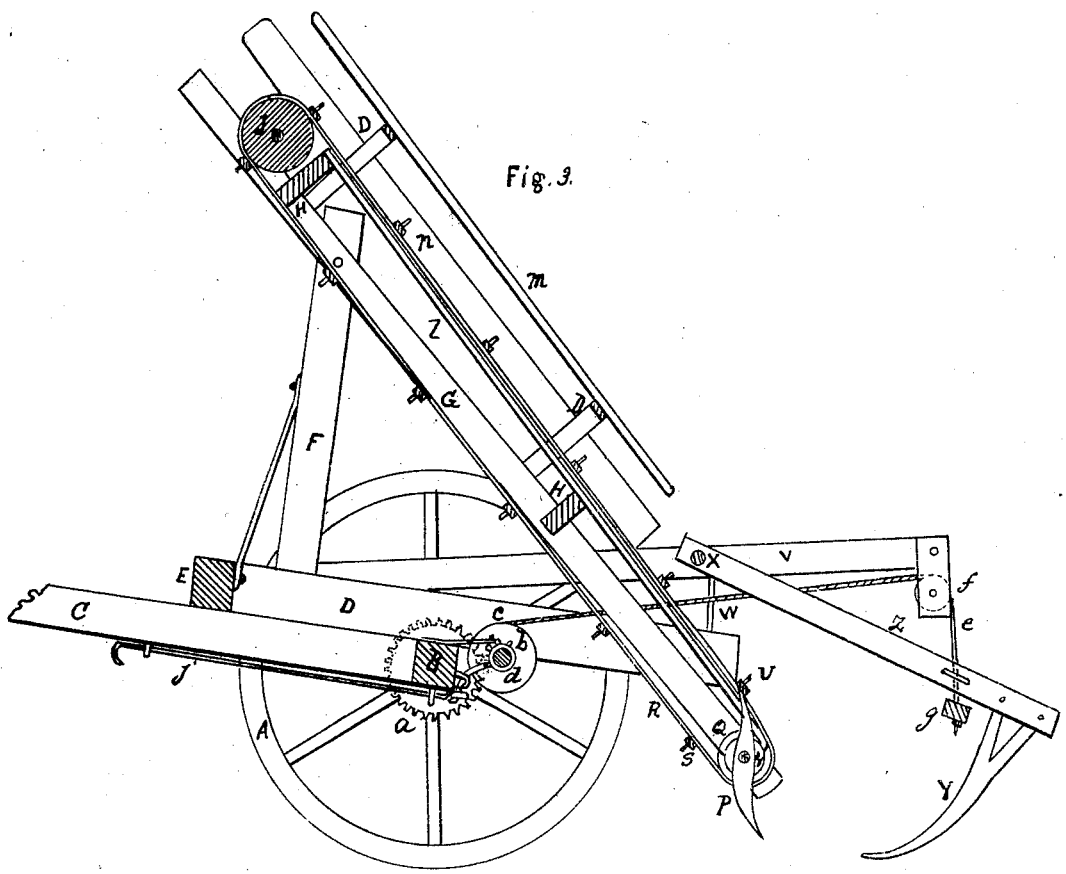

UNITED STATES PATENT OFFICE.

MILES K. LEWIS AND JOHN C. DURBIN, OF IOWA CITY, IOWA.

IMPROVEMENT IN HAY-LOADERS.

Specification forming part of Letters Patent No. 45,726, dated January 3, 1865.

*To all whom it may concern:*

Be it known that we, MILES K. LEWIS and JOHN C. DURBIN, of Iowa City, in the county of Johnson and State of Iowa, have invented a new, useful, and Improved Machine for Raking and Elevating Hay, Grain, and other Crops; and we do hereby declare that the same is described and represented in the following specification and drawings.

To enable others skilled in the art to make and use our improved machine, we will proceed to describe its construction and the mode of using it, referring to the drawings, in which the same letters indicate like parts in each of the figures.

Figure 4:
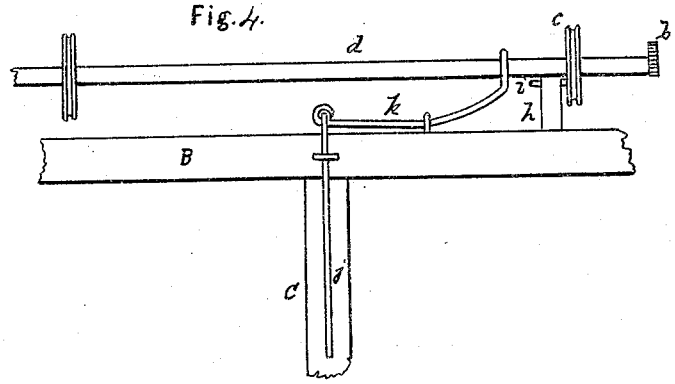

Figure 1 is a plan or top view of our machine. Fig. 2 is an elevation of one side. Fig. 3 is a sectional elevation of the machine cut lengthwise. Fig. 4 is a plan of the under side of the axle, and part of the apparatus for raising the rake-teeth when the machine is run back.

The nature of our improved machine is described and fully set forth in the following specification and accompanying drawings, in which—

A A are the wheels, B the axle, and C the tongue, by which the machine may be connected to the cart or wagon on which the hay or grain is to be loaded in some convenient manner.

D D are the side rails, fastened to the axle and to the front bar, E, which crosses the tongue and is fastened to it.

F F are standards fastened in the rails D to support the inclined bars G G, which are fastened to them and to the rails D in the position shown in the drawings. The inclined bars G are connected by the cross-bars H H, which are fastened in them to strengthen and steady the frame. There are some adjustable boxes I fastened to the upper ends of the inclined bars G for the journals of the roller J to turn in across the upper end of the frame. The left-hand journal is provided with a pulley to turn the roller J by the band K from the pulley L on the side of the wheel A. The rod M passes through the lower ends of the inclined bars G for the pulleys N N and the arms P P to turn on, with the blocks Q to keep them a uniform distance apart. The bands R R pass around the pulleys N N and the roller J, to which bands the slats S S are fastened to form an endless apron of slats to elevate the hay, &c. There are pins U passing through the slats to prevent the hay from falling back while being carried up by the endless apron. The revolving arms P P, being arranged on the rod M, are turned by the slats S S to catch the hay and throw it on the endless apron of slats. There are two bars, V V, fastened to the rails D and supported by the standards W W. These bars are perforated for the rod X, on which rod the heads Z of the raking-teeth Y vibrate in the process of raking. Each tooth has an independent head arranged to vibrate on the rod X and allow the teeth to rise and fall independent of each other and adapt themselves to the undulating surface of the ground. The spur-wheel $a$, fastened to the hub of the drive-wheel A, meshes in the quarter-pinion $b$, revolving the pulleys $c$ $c$, which are fastened to the shaft $d$. To these pulleys are attached the cords $e$ $e$, which run back over the pulleys $f f$, hung under the ends of the bars V V, and are fastened to the bar $g$, which extends across under the rake-heads to lift them clear of the ground when the machine is run back. There is a spring, $h$, which strikes against the pin $i$ in the pulley $c$, which causes the quarter-pinion to readily mesh in the spur-wheel. There is a rod, $j$, passing through staples on the under side of the tongue C, which is connected to the lever $k$, which works upon a center, while the other end of the lever is connected to the shaft $d$, by which means the quarter-pinion is thrown into gear and the teeth raised in backing by means of the rod $j$ being pressed back by the connection of the machine to the wagon when the team is backed. There are slats $l$ $l$ fastened to the cross-bars H H and to the blocks Q, upon which the hay is carried by the slats S S to the upper part of the machine, where it is dumped on the wagon or cart prepared to receive it. The upper cover of slats $m$ $m$ and the side boards, $n$ $n$, are fastened to the cross-pieces $o$ $o$ to prevent the wind from blowing the hay off the apron while being carried up in the process of operation. The pulley $p$ is used as a tightening-pulley for the band $k$.

To use our improved machine for loading hay, grain, and other crops on a cart or wagon, we fasten it behind the vehicle, so that as the hay is raked and gathered into the curve of the teeth it is caught by the rotating arms P P and carried on the endless apron, and the slats carry the hay up over the roller J and let it fall into the vehicle arranged to receive it.

We believe we have described and represented our improved machine for raking, elevating, and loading hay, so as to enable any person skilled in the art to make and use it without further invention or experiment; and we will now state what we desire to secure by Letters Patent, to wit:

1. The combination of the transverse rod $j$, lever $k$, shaft $d$, pulleys $c\ c$, cords $e\ e$, cross-bar $g$, with the rake for the purpose of raising the rake with the gearing $a\ b$, when the vehicle is backed to which the machine is connected.

2. The arrangement of the elevating-belt of slats, in connection with the rotating arms P P for joint operation, as and for the purpose described.

MILES K. LEWIS.
JOHN C. DURBIN.

Witnesses:
J. H. BRANCH,
D. W. C. CLAPP.